United States Patent
Burman

(10) Patent No.: US 11,223,156 B2
(45) Date of Patent: Jan. 11, 2022

(54) COLLAR FOR CONNECTOR ASSEMBLY

(71) Applicant: Advantage Components, Inc., Joliet, IL (US)

(72) Inventor: Michael Burman, Shorewood, IL (US)

(73) Assignee: Advantage Components, Inc., Joliet, IL (US)

( * ) Notice: Subject to any disclaimer, the term of this patent is extended or adjusted under 35 U.S.C. 154(b) by 0 days.

(21) Appl. No.: 16/828,516

(22) Filed: Mar. 24, 2020

(65) Prior Publication Data

US 2020/0313339 A1 Oct. 1, 2020

Related U.S. Application Data

(60) Provisional application No. 62/824,599, filed on Mar. 27, 2019.

(51) Int. Cl.
| | |
|---|---|
| *H01R 13/504* | (2006.01) |
| *H01R 43/20* | (2006.01) |
| *H01R 13/627* | (2006.01) |
| *H01R 13/64* | (2006.01) |

(52) U.S. Cl.
CPC ....... *H01R 13/504* (2013.01); *H01R 13/6272* (2013.01); *H01R 13/64* (2013.01); *H01R 43/20* (2013.01)

(58) Field of Classification Search
CPC ... H01R 13/504; H01R 13/6272; H01R 13/64
USPC ........................................................ 439/357
See application file for complete search history.

(56) References Cited

U.S. PATENT DOCUMENTS

| | | | | | |
|---|---|---|---|---|---|
| 2,654,869 | A | * | 10/1953 | Mudd, Jr. ............. | H01R 39/64 439/27 |
| 3,093,434 | A | * | 6/1963 | Francis ................. | H01R 24/28 439/695 |
| 3,950,069 | A | * | 4/1976 | Wiley ................... | H01R 13/56 439/694 |

(Continued)

FOREIGN PATENT DOCUMENTS

CN             108470995 A      8/2018

OTHER PUBLICATIONS

Right Angle Anglissimo Plugs (IP 68); 2018-12; Lemo SA.
Assembly Instruction NC*FRX & NC*MRX/ XLR Cable Connector; Jul. 13, 2011; Neutrik AG.

*Primary Examiner* — Alexander Gilman
(74) *Attorney, Agent, or Firm* — Gould & Ratner LLP

(57) ABSTRACT

A cable assembly is provided comprising a collar adjacent to a cable transition member, the cable transition member having a first longitudinal axis $x^1$, the collar having a second longitudinal axis $x^2$. The cable transition member provides for a cable to extend by approximately 90 degrees from the first axis $x^1$ of the cable transition member, a connector body having a non-circular outer diameter, wherein the collar is disposed between the connector body and the cable transition member so that the first axis $x^1$ and the second axis $x^2$ are aligned and the collar secures the cable transition member in a predetermined angular orientation z with respect to the connector body. The angular orientation z of the cable transition member with respect to the connector body is other than 90, 180, 270 or 360 degrees with respect to the first axis $x^1$.

17 Claims, 4 Drawing Sheets

(56) References Cited

U.S. PATENT DOCUMENTS

| | | | | |
|---|---|---|---|---|
| 5,399,093 | A * | 3/1995 | Schneider | H01R 24/28 |
| | | | | 439/21 |
| 5,595,503 | A * | 1/1997 | Pittman | H01R 13/56 |
| | | | | 439/11 |
| 5,775,921 | A * | 7/1998 | Chou | H01R 39/64 |
| | | | | 439/21 |
| 6,230,405 | B1 * | 5/2001 | Liu | H01R 13/405 |
| | | | | 264/255 |
| 7,255,568 | B1 * | 8/2007 | Wu | B60C 19/002 |
| | | | | 439/23 |
| 7,566,223 | B2 * | 7/2009 | Wadsworth | H01R 35/04 |
| | | | | 439/21 |
| 7,753,682 | B2 * | 7/2010 | Gerard | H01R 35/02 |
| | | | | 439/13 |
| 7,922,511 | B1 * | 4/2011 | Schweitzer | H01R 13/625 |
| | | | | 439/314 |
| 7,946,852 | B2 * | 5/2011 | John | H01R 35/04 |
| | | | | 439/21 |
| 8,133,060 | B2 * | 3/2012 | Wadsworth | H01R 35/02 |
| | | | | 439/21 |
| 8,287,284 | B1 * | 10/2012 | Nishizawa | H01R 39/643 |
| | | | | 439/13 |
| 8,651,879 | B2 * | 2/2014 | Stiehl | H01R 13/6658 |
| | | | | 439/76.1 |
| 8,821,171 | B2 * | 9/2014 | Belongia | H01R 35/04 |
| | | | | 439/166 |
| 8,858,236 | B2 * | 10/2014 | Richard | H01R 24/68 |
| | | | | 439/21 |
| 9,673,577 | B2 * | 6/2017 | Chang | H01R 43/005 |

* cited by examiner

COLLAR FOR CONNECTOR ASSEMBLY

The present application claims priority from Provisional application No. 62/824,599 filed Mar. 27, 2019.

The invention is a collar and method of making a collar for converting a standard right angle cable and connector assembly to an assembly that can be oriented in a predetermined angular orientation of the assembly with respect to a host receptacle.

BACKGROUND

Custom cable assemblies are well known for providing electrical connections between components having predetermined spacing. Each cable assembly may have a connector at a first end and another connector at a second end of the cable. The length of the cable is determined by the application. Also pre-fabricated components may be attached to the cable depending on the application. Some applications require a right angle connection. Such a right angle may be accomplished by attaching pre-fabricated connector having a right angle at an end of the cable. For many applications this solution may be sufficient. But other applications where the orientation that the right angle bend is to be positioned must be customized and further innovation is required. The present invention solves such an issue.

In a standard injection molding process for a non-circular connector body the mold can normally open in either a 90, 180, 270 or 360 degrees position with respect to the cross section of the connector body providing a mold line along a major longitudinal axis of the connector body. If a right angle cable were to be attached to the connector it would normally be molded according to the major longitudinal axis and only allow for the right angle bend coming from the 90, 180, 270 or 360 degree radial positions off the connector body. However, by using an insert between the cable and the connector body, additional angular orientations may be obtained for setting the right angle cable at a non-interfering orientation with respect to a host device.

SUMMARY

The present invention provides a cable assembly comprising a collar adjacent to a cable transition member, the cable transition member having a first longitudinal axis $x^1$, the collar having a second longitudinal axis $x^2$. The cable transition member provides for a cable to extend by approximately 90 degrees from the second axis $x^2$ of the cable transition member, a connector body having a non-circular outer diameter, wherein the collar is disposed between the connector body and the cable transition member so that the first axis $x^1$ and the second axis $x^2$ are aligned and the collar secures the cable transition member in a predetermined angular orientation z with respect to the connector body. In an embodiment, the cable assembly wherein the angular orientation z of the cable transition member with respect to the connector body being other than 90 or 180 degrees with respect to the first axis $x^1$. In an embodiment, the cable assembly wherein the angular orientation z of the cable transition member with respect to the connector body being other than 270 or 360 degrees with respect to the first axis $x^1$. The cable assembly may have the collar attached to the connector body by one of injection molding or mechanical means.

The cable assembly may further comprise the connector body having a triangular outer shape in cross-section. The cable assembly may have the connector body received by an indexing tool having an interior receptacle having a triangular shape, corresponding to the outer shape of the connector body. The indexing tool may include indicia having one of markings, numerals, alphanumeric or arrows, the indicia for setting the angular orientation z in a predetermined position of the cable transition member with respect to the connector body. The indexing tool may include a fastener to secure a first half of the tool to a second half of the tool. The cable assembly may further comprise a latch-lever disposed on the connector body and upon final assembly of the cable assembly the latch-lever will not interfere with the connection of the cable assembly with a host receptacle.

In another embodiment, a method of assembling a cable assembly is provided comprising the steps of providing a connector body and cable transition member, selecting a predetermined orientation of the cable assembly, inserting a collar between the cable transition member and the connector body, placing a connector body adjacent the cable transition member at the predetermined orientation, rotating the connector body with respect to the cable transition member, securing the connector body in place in its predetermined orientation with respect to the cable transition member and fastening the collar in a non-movable position between the connector body and cable transition member.

In an embodiment, the method wherein the cable extends at a right angle, so that the cable does not interfere with components extending from a host receptacle. In an embodiment, the method wherein the cable assembly is mateable to a host receptacle and oriented with respect to the host receptacle between 1 and 360 degrees. The method may further comprise the step of securing the collar in a manner that the collar does not interfere with the mating mechanism of the connector. The method may further comprise the step of insert molding the collar and cable transition member over the connector body. The method may further comprise the step of insert molding the cable transition member over the connector body. The method may further comprise the step of snap-fitting the connector body to the cable transition member.

In a further embodiment a collar is provided comprising a circular outer diameter and the collar adjacent to a cable transition member, the cable transition member having a first longitudinal axis $x^1$, the collar having a second longitudinal axis $x^2$, a connector body having a non-circular outer diameter and wherein the collar is attached between the connector body and the cable transition member, so that the first axis $x^1$ and the second axis $x^2$ are aligned. Wherein attachment of the collar may secure the cable transition member in a predetermined angular orientation with respect to the connector body. The collar may be injection molded onto the connector body. Or the collar may be snap-fit onto the connector body.

BRIEF DESCRIPTION OF THE DRAWINGS

The drawing figures only disclose a single embodiment of the present invention and like reference numbers and designations in the different figures indicate like elements in the Detailed Description below.

DETAILED DESCRIPTION

Figure 1:
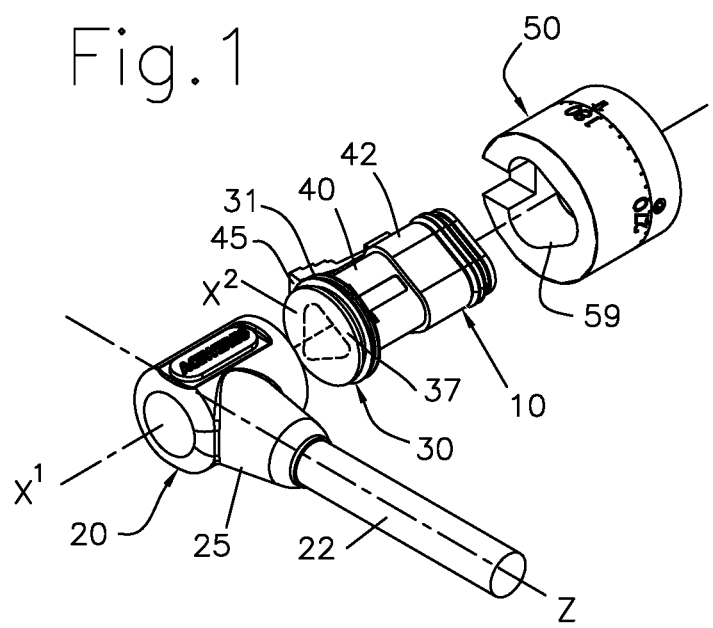
FIG. 1 is an exploded perspective view of the cable assembly of the present invention being inserted into an indexing tool.
Figure 2:
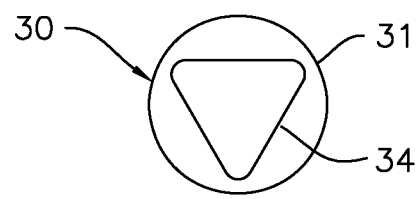
FIG. 2 is an end view of a collar of the present invention.

An embodiment of the present invention is depicted with respect to FIGS. 1-4 showing a cable assembly 10 including a cable transition member 20 to be attached to a connector body 40. The cable transition member 20 includes a boot 25 and cable 22. Referring to FIGS. 1 and 2, a collar 30 with a circular outer diameter 31 is placed onto an existing non-circular connector body 40. The connector body 40 has a triangular shape 42 and the collar 30 has a corresponding inner shape 34, so that mounting of the collar 30 to the connector body 40, 42 maintains the connector body 40 in a fixed angular orientation. The angular orientation of the connector body 40 may be adjusted by the placement of the collar 30 onto the cable assembly 20. The circular outer diameter 31 of the collar 30 allows for the angular adjustment of the connector/collar assembly with respect to the cable transition member 20. For example, the collar 30 (prior to attachment) may be oriented in any orientation between 1 and 360 degrees. By securing the collar 30 to the cable transition member 20 (either by insert molding the collar 30 to the cable transition member 20 or mechanically attaching the collar 30 to the cable transition member 20) the orientation of the cable 22 with respect to the connector 10 is fixed (also with respect to a host receptacle).

The connector body 40, 42 may be oriented in a predetermined position with respect to the cable transition member 20 by fixing the collar 30 in the predetermined position between the connector body 40, 42 and the cable transition member 20. The connector body 40, 42 is oriented in a predetermined position with respect to the cable transition member 20. The circular outer diameter 31 shape of the collar 30 allows for orientation of the collar 30 with respect to the cable transition member 20 in a predetermined orientation via insert molding or mechanical attachment. The inner diameter shape/outer diameter 34 of the collar 30 corresponds to the rectangular or triangular shape 34 of the connector body 42 in order to fix the orientation of the connector body 40 with respect to the collar 30.

FIG. 1 depicts an exploded view of the cable assembly 10 and the connector body 40, 42. The cable transition member 20 includes a longitudinal axis 'x$^1$' which aligns with the longitudinal axis 'x$^2$' of the connector body 40/collar 30. Also depicted is the rotating indexing tool 50, which will be explained in further detail with respect to FIG. 3.

FIG. 1 depicts the cable assembly 10 prior to assembly and depicts the cable 22 in an orientation along a major longitudinal axis (e.g. the cable 22 and its longitudinal axis z, is oriented at 180 degrees with respect to the longitudinal axis x$^1$ of the transition member 20 and x$^2$ of the connector body 40, 42). In a preferred embodiment, the cable assembly 10 will be oriented with the cable 22 and its axis z, in a non-major longitudinal axis (e.g. not 90, 180, 270 or 360 degrees), when orienting the position of the transition member 20 with respect to the connector body 40, 42.

FIG. 2 depicts the collar 30 having an outer diameter 31 of a cylindrical shape and an inner diameter 34 having a rectangular or triangular shape. In an embodiment, the connector body 40 has a triangular outer diameter and corresponds to the inner diameter 34 of the collar 30. In an embodiment the collar 30 is mechanically attached in between the connector body 40, 42 and the cable transition member 20. The collar 30 may be snap-fit onto the connector end face 37 (see FIG. 1). And, in such an embodiment, injection molding of the collar 30 via insert molding is not necessary.

Figure 3:
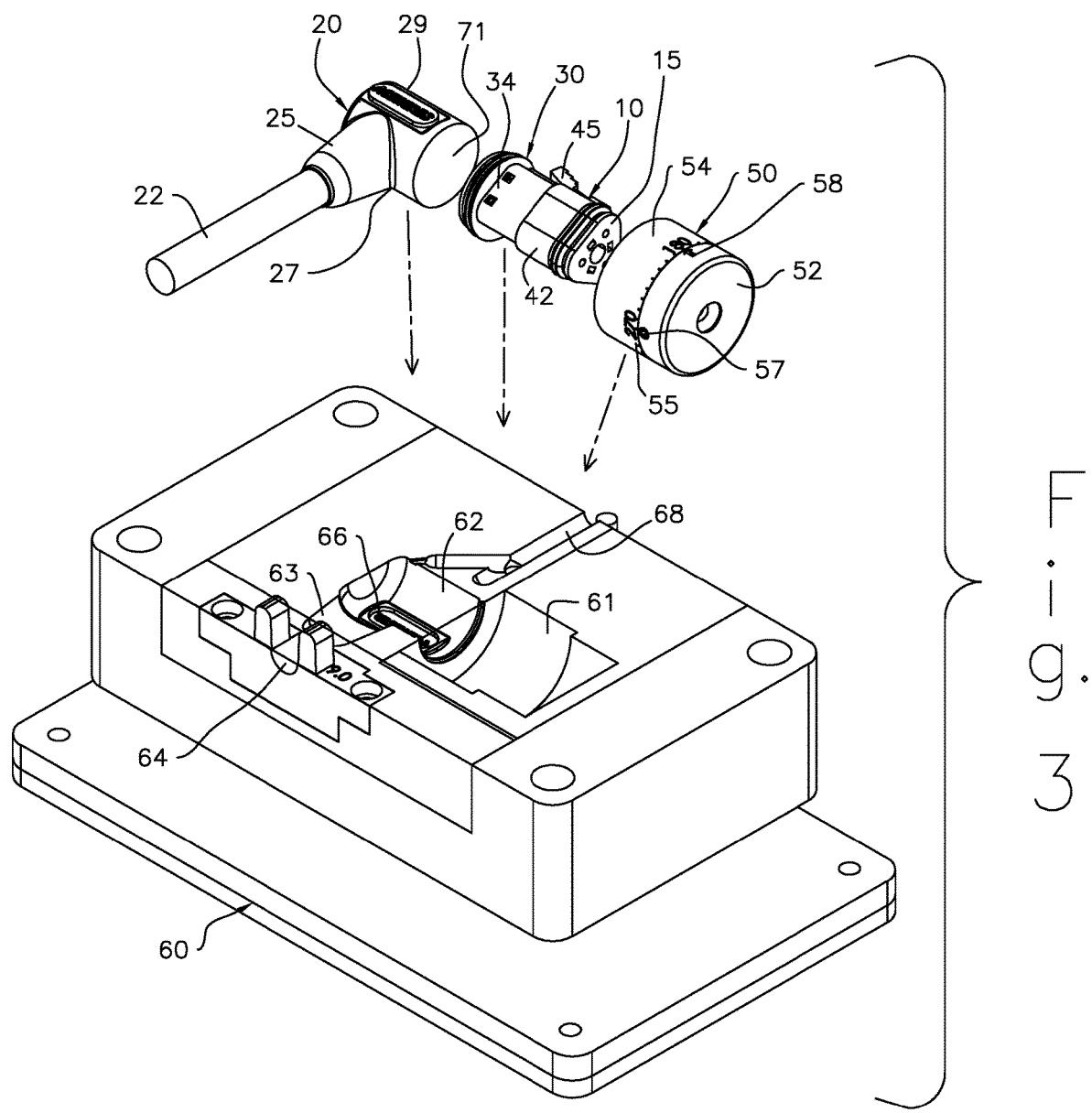
FIG. 3 is an exploded perspective view of the present invention of FIG. 1 prior to molding in a mold cavity of the present invention.

Turning to FIG. 3, an exploded view of the injection molding tool 60 is depicted prior to insertion of the cable 22, transition member 20, connector body 42 and rotating indexing tool 50 to the tool 60. In another embodiment, the injection molding of the collar 30 will be explained with respect to FIG. 3. (The depiction of the collar 30, upper cylinder 27, transition member 20 and boot 25 as shown in FIG. 3 is only for illustration purposes and in the actual injection molding process there would be no collar 30 as part of the connector body 42 (and only the cable 22) as the collar 30, cylinder 29 and boot 25 must be insert molded via the mold 60).

The mold 60 includes first, second, third, fourth mold cavity segments 61, 62, 63, 64. The first mold cavity segment 61 receives the connector body 42 and rotating indexing tool 50. As shown in FIG. 3, cavity 61 does not have an injection tube and no molten polymer is injected into cavity 61. Cavity 61 is a non-active cavity for receiving the connector body 42 (which was previously injection molded at a different factory or in a different manufacturing step) and indexing tool 50.

The rotating indexing tool 50 includes a first half 52 which is rotatable with respect to second half 54. Indicia, such as degree markings are provided on the outer diameter of the second half 54. For example, numerals 55 that are aligned with the arrow indicia 58. In FIG. 3, the indexing tool is oriented to position the cable body 42 at "180" degrees as it is the indicia aligned with arrow 58. 180 degrees (indicia 58) is the angular orientation of the cable 22 and its axis z (FIG. 1), with respect to axis x$^1$ and x$^2$ as depicted in FIG. 3. Once the rotating indexing tool 50 is rotated and indexed to the desired position (other than 90, 180, 270 or 360 degrees), so that the connector body 42 is oriented with respect to the cable 22 in the desired orientation on a non-major longitudinal axis; a fastener 57 is secured to lock the first half 52 to the second half 54 of the rotating indexing tool 50. For example, an Allen wrench may be inserted in the hex nut receptacle 57, so that the first half 52 may be fastened to the second half 54. (Reference to the cable assembly at a "right angle" is with respect to the bend 27 being at a 90 degree bend of the boot 25 with respect to cylinder 29, which is fixed with respect to the cable 22. The variable angular orientation of axis z, on the other hand, is with respect to axis x$^1$/x$^2$.)

The rotating indexing tool 50 includes an inner diameter cavity 59 (see FIG. 1) that receives the connector body 42. The connector body 42 in a preferred embodiment has a triangular shaped outer diameter and the corresponding cavity (inner diameter) of the rotating indexing tool 50 second half 54 is also triangular shaped 59. Thus it is understood when rotating the second half 54 of the rotating indexing tool 50, that the connector body 42 will rotate in conjunction with the rotation of the second half 54 of the rotating indexing tool 50. The indexing tool 50 and connector body 42 (following insertion within the cavity 59 of the rotating indexing tool 50) are both inserted simultaneously within the first cavity 61.

In a first embodiment, a bare cable 22 is inserted into fourth mold segment 64 and the rest of the transition member 20 (cylinder 29 and boot 25) is injection molded thereon. In a second embodiment, the cable 22 is prepared separately and the transition member 20 is pre-assembled. In the second embodiment, the upper cylindrical body 29 is inserted within the second mold cavity segment 62, the boot 25 is inserted within the third mold cavity segment 63 and the cable 22 is laid within the fourth mold cavity segment 64 and extends out of the cavity therefrom. The cable assembly 20 is fixed in position with respect to the connector body 10, so that first axis $x^1$ is aligned with the longitudinal axis $x^2$ of the cylinder 29. The alignment of the connector body 42 also aligns the latch lever 45 or key-way, so that it will not interfere with the attachment of the connector 10 (following the injection molding steps) when the connector is attached to a host. The front face 71 of the cylinder 29 abuts against the face 34/37 (FIG. 1) of the connector body 42 and this is the location where the insert molding of the collar 30 occurs.

Figure 4:
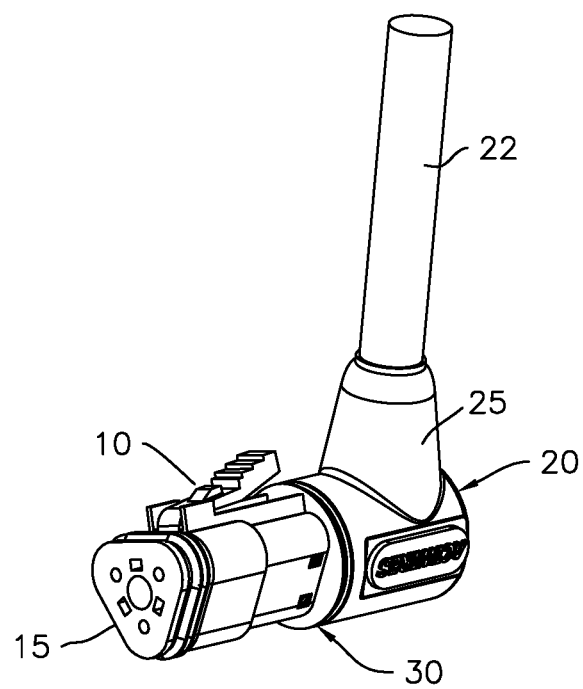
FIG. 4 is a perspective view of the completed cable assembly of the present invention.

Injection tube 68 of the mold 60 receives molten plastic that is insert molded around the connector body 42 and adheres against the face 71 of the cylinder 29 of the transition member 20. Such insert molding fixes the cable 22 and transition member 20 to the connector body 42 and fixes the orientation of the connector body 42 with respect to the cylinder 29. It is understood that the mold half 60 depicted in FIG. 3 is enclosed with a second mold half (that is a mirror image of the first half) in order to complete the insert molding step. Following the insert molding, the mold half 60 is separated from the second mold half (not shown) so that the completed cable assembly 10 may be removed from the mold. The connector body 42 is then removed from the rotating indexing tool 50 and the connector body front end 15 may then be connected to a host receptacle in the field. The completed assembly 10 is depicted in FIG. 4, showing the connector body attached to the cable transition member 20 and the front end 15 of the cable assembly 10 ready to be mated with a host receptacle. The collar 30 is shown in its fixed position between the connector body 10 and the cable transition member 20.

The invention includes the following steps:

a. Provide a standard non-circular connector body 42 (may be a 3$^{rd}$ party manufactured connector) and cable transition member 20 mateable to a host receptacle;

b. Select a predetermined orientation of the assembly with respect to the host receptacle between 1 and 360 degrees using indexing tool 50 (so that the cable extending at a right angle does not interfere with components extending from the host receptacle):

c. Take the connector body 42 for supplemental operation separate from the cable 20;

d. Attach a collar 30 between the cable transition member 20 and the connector body 42 either by insert molding (FIG. 3) or mechanically placing the collar 30 onto the connector body 42 adjacent the cable transition member 20 at the predetermined orientation by rotating the connector body 42 with respect to the cable assembly 20 (e.g., using an indexing tool;

e. Securing the connector body 42 in place in its predetermined orientation with respect to the cable 22 by fastening the collar 30 in non-movable position between the connector body 42 and cable transition member 20 (either by insert molding or mechanical means (e.g. snap-fit)); and securing the collar 30 in a manner that it does not interfere with the mating mechanism of the connector (e.g. a latch lever or key-way of the connector); and f. Attaching the assembly to the host receptacle in the predetermined orientation so that the right angle 27 cable 22 does not interfere with any components extending from the host receptacle. In another embodiment the right angle bend 27 could be replaced with any angle between 91 degrees and 179 degrees relative to $x^1$.

The foregoing description of the invention has been presented for purposes of illustration and is not intended to be exhaustive or to limit the invention to the embodiments disclosed. Modifications and variations will be apparent to those skilled in the art and the scope of the invention is defined solely by the following claims and their equivalents.

What is claimed is:

1. A cable assembly comprising: a collar adjacent to a cable transition member; the cable transition member having a first longitudinal axis x1; the collar having a second longitudinal axis x2; a connector body having a non-circular outer diameter; wherein the collar is disposed between the connector body and the cable transition member so that the first axis x1 and the second axis x2 are aligned; and the collar secures the cable transition member in a predetermined angular orientation z with respect to the connector body so that the connector body is non-rotatable and non-movable with respect to the cable transition member wherein the angular orientation z of the cable transition member with respect to the connector body being other than a major longitudinal axis with respect to the first axis x1.

2. The cable assembly of claim 1, wherein the angular orientation of the cable transition member with respect to the connector body being other than 90, 180, 270 or 360 degrees with respect to the first axis x1 and the cable transition member providing for a cable to extend by approximately 90 degrees from the first longitudinal axis x1 of the cable transition member.

3. The cable assembly of claim 1 wherein the collar is attached to the connector body by one of injection molding or mechanical means.

4. The cable assembly of claim 1 further comprising the connector body having a triangular outer shape in cross-section.

5. The cable assembly of claim 4 wherein the connector body is received by an indexing tool having an interior receptacle having a triangular or irregular shape, corresponding to the outer shape of the connector body.

6. The cable assembly of claim 5, wherein the indexing tool includes indicia including one of markings, numerals, alphanumeric or arrows, the indicia for setting the angular orientation in a predetermined position of the cable transition member with respect to the connector body.

7. The cable assembly of claim 5 wherein the indexing tool includes a fastener to secure a first half of the tool to a second half of the tool.

8. The cable assembly of claim 1 further comprising a latch-lever disposed on the connector body and upon final assembly of the cable assembly the latch-lever will not interfere with the connection of the cable assembly with a host receptacle.

9. A method of assembling a cable assembly comprising the steps of: providing a connector body and cable transition member; selecting a predetermined orientation of the cable assembly; inserting a collar between the cable transition member and the connector body placing a connector body adjacent the cable transition member at the predetermined orientation; rotating the connector body with respect to the cable transition member; securing the connector body in place in its predetermined orientation with respect to the cable transition member; fastening the collar in a non-movable position between the connector body and cable transition member so that the connector body is non-rotatable and non-movable with respect to the cable transition member; and insert molding the collar and cable transition member over the connector body.

10. The method of claim 9 wherein the cable extending at a right angle, so that the cable does not interfere with components extending from a host receptacle.

11. The method of claim 9 wherein the cable assembly is mateable to a host receptacle and oriented with respect to the host receptacle between 1 and 360 degrees.

12. The method of claim 9 further comprising the step of securing the collar in a manner that the collar does not interfere with the mating mechanism of the connector.

13. The method of claim 9 further comprising the step of insert molding the cable transition member over the connector body.

14. The method of claim 9 further comprising the step of snap-fitting the connector body to the cable transition member.

15. A collar comprising a circular outer diameter and the collar adjacent to a cable transition member, the cable transition member having a first longitudinal axis x1; the collar having a second longitudinal axis x2; a connector body having a non-circular outer diameter; and wherein the collar is attached between the connector body and the cable transition member, so that the first axis x1 and the second axis x2 are aligned and the connector body is non-rotatable and non-movable with respect to the cable transition member, wherein the collar is injection molded onto the connector body.

16. The collar of claim 15 wherein attachment of the collar secures the cable transition member in a predetermined angular orientation with respect to the connector body.

17. The collar of claim 15 wherein the collar is snap-fit onto the connector body.

\* \* \* \* \*